United States Patent [19]

Danko et al.

[11] Patent Number: 4,687,017

[45] Date of Patent: Aug. 18, 1987

[54] INVERTED BELLOWS VALVE

[75] Inventors: Oliver L. Danko, Chesterland; Carl R. Bork, Jr., Euclid, both of Ohio

[73] Assignee: Nupro Company, Willoughby, Ohio

[21] Appl. No.: 856,718

[22] Filed: Apr. 28, 1986

[51] Int. Cl.⁴ ............... F16K 43/00; F16K 31/124
[52] U.S. Cl. ................... 137/315; 137/312; 251/63.5; 251/335.3
[58] Field of Search ........... 251/61.5, 62, 63, 63.5, 251/63.6, 335.3, 335.2, 214; 137/312, 315

[56] References Cited

U.S. PATENT DOCUMENTS

| | | | |
|---|---|---|---|
| 3,206,165 | 9/1965 | Salmon et al. | 251/335.3 |
| 3,542,332 | 11/1970 | Chevalier et al. | 251/63.6 |
| 3,787,023 | 1/1974 | Shufflebarger et al. | 251/335.3 |
| 4,201,366 | 5/1980 | Danko et al. | 251/335.3 |
| 4,348,005 | 9/1982 | Eaton et al. | 251/335.3 |
| 4,431,159 | 2/1984 | Stubbs | 251/63.6 |
| 4,515,344 | 5/1985 | Gemignani | 251/63.5 |
| 4,526,341 | 7/1985 | Thomas | 251/63.5 |

FOREIGN PATENT DOCUMENTS

| | | | |
|---|---|---|---|
| 1234306 | 10/1960 | France | 251/335 B |
| 1384752 | 12/1965 | France | 251/335 B |
| 1417343 | 12/1975 | United Kingdom | 251/335 B |

*Primary Examiner*—George L. Walton
*Attorney, Agent, or Firm*—Fay, Sharpe, Beall, Fagan, Minnich & McKee

[57] ABSTRACT

A bellows valve has inlet and outlet passages in fluid communication with a valve chamber on opposite sides of a valve seat. An elongated valve stem has a first end adapted for selective sealing engagement with the valve seat, and a second end of the stem is operatively connected with an actuator assembly. An expansible bellows has a first end secured to the valve stem and a second end sealingly connected to a closing member so that a portion of the valve stem is surrounded thereby. The closing member engages an open end of the valve body and includes an arcuate or rounded sealing protrusion or bead adapted for mating, sealing contact with a generally planar surface on the valve body. The sealing bead facilitates a reduction in or complete elimination of the use of lubricant between the valve body and a bonnet nut, and this, in turn, promotes clean valve operation by removing a potential contaminant. A tapered surface on the closing member faciitates alignment with the valve body, and clearances between the closing member, valve bonnet, and bonnet nut also facilitate alignment of the assembled valve components.

19 Claims, 5 Drawing Figures

INVERTED BELLOWS VALVE

BACKGROUND OF THE INVENTION

This invention pertains to the art of shutoff valves and more particularly to bellows valves.

The invention is particularly applicable to an inverted bellows valve assembly and will be described with particular reference thereto. However, it will be appreciated that the invention has broader implications and may be advantageously employed in other valve environments and applications.

Bellows valves are commonly employed in environments where sealing and cleanliness are of utmost importance. For example, bellows valves are used in the chemical industry to shut off flow of various system fluids and the like. Because of the caustic nature of many of these fluids, a more reliable sealing relationship between wetted components of the valve is always desirable.

In other industries such as the semiconductor industry, it is desirable that the surrounding environment remain as free of contaminants as possible to prevent introduction of imperfections into the final product. In the past, a suitable lubricant was necessarily placed between cooperating threaded components. The lubricant, although a requisite for valve assembly, can be considered a contaminant in such closely monitored applications as the semiconductor industry. Therefore, reduction and/or elimination of the lubricant is highly desirable from the standpoint of cleanliness.

The subject invention provides a new and improved inverted bellows valve construction which is deemed to meet the foregoing needs and solve the above-described problems and shortcomings associated with prior valve designs.

SUMMARY OF THE INVENTION

According to the subject invention, an inverted bellows valve assembly is provided that is particularly adapted for enhanced sealing between the valve components and for promoting cleanliness in the valve environment.

In accordance with the invention, the bellows valve includes a valve body having inlet and outlet passages communicating with a valve chamber defined therein on opposite sides of a valve seat. A valve stem is operatively disposed in the valve chamber and has a portion adapted for selective engagement with the valve seat. A closing member is received around the valve stem and sealingly engages an open outer end of the valve body. One of the valve body and the closing member includes a protrusion or bead designed for sealingly engaging the other of the valve body and closing member. A bellows surrounds a lower portion of the valve stem and is sealingly secured thereto at one end of the bellows and to the closing member at the other end of the bellows so that external compressive forces will be exerted on the bellows by system fluid.

In accordance with another aspect of the invention, a stem tip is threadedly secured to one end of the valve stem, and means are provided at the valve stem other end for retaining the stem in a desired orientation during replacement of the stem tip.

According to yet another aspect of the invention, a retaining member operatively engages the valve body for retaining a valve bonnet, the closing member, and valve body in abutting, sealing relation with each other.

According to yet another aspect of the invention, strategically located tapered surfaces and spaced axial surfaces facilitate close alignment between the cooperating valve components.

A principal advantage of the present invention is found in enhanced sealing between the various valve components.

Yet another advantage of the invention resides in the operative cleanliness of the valve assembly.

A still further advantage is realized in the accurate alignment achieved between the valve components.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof and wherein.

DETAILED DESCRIPTION OF THE PREFERRED AND ALTERNATIVE EMBODIMENTS

Figure 1:
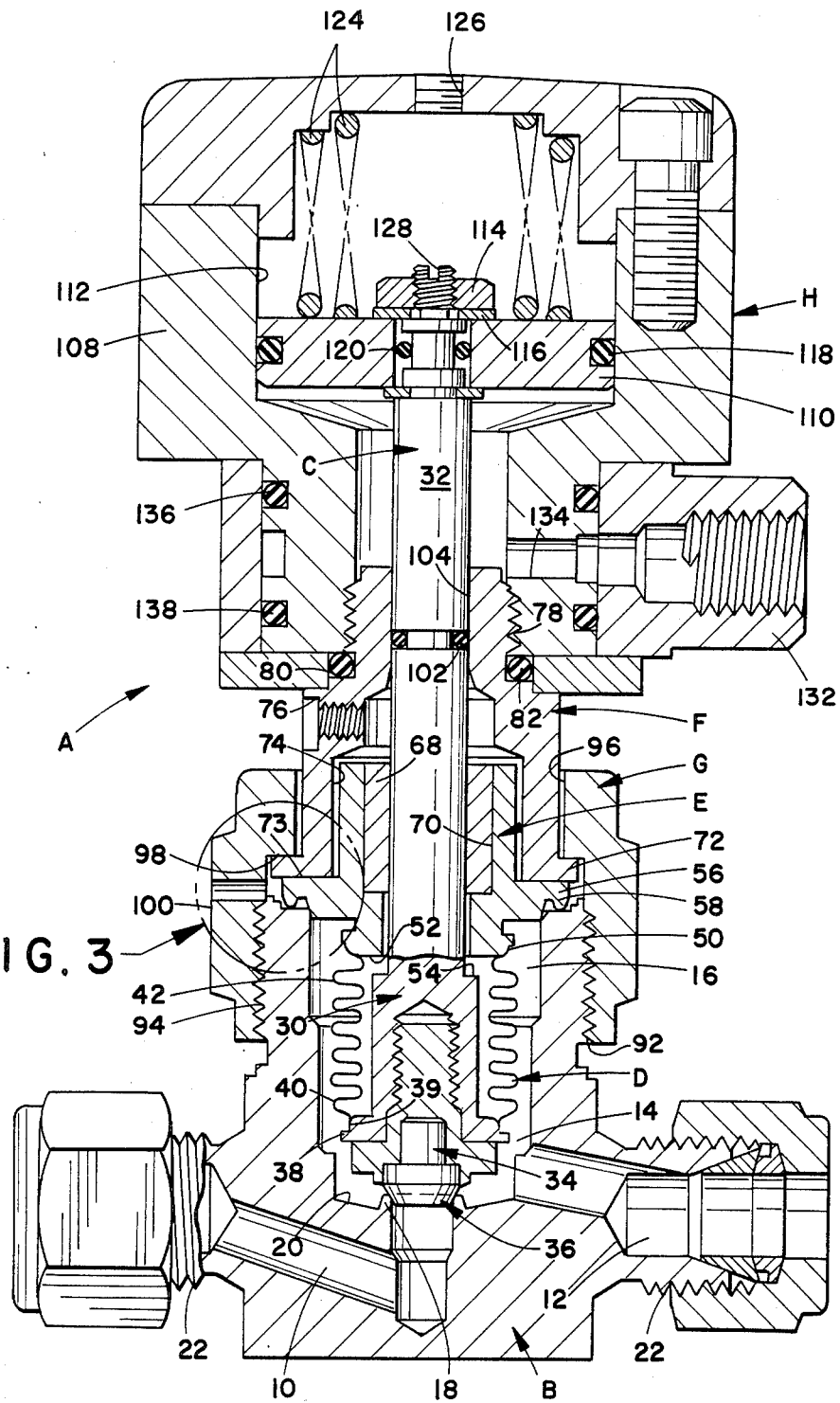
FIG. 1 is a vertical cross-sectional view of a bellows valve constructed in accordance with the subject invention.

Referring now to the drawings wherein the showings are for illustrating preferred and alternative embodiments of the invention only and not for purposes of limiting same, FIG. 1 shows an inverted bellows valve A which includes a valve body B operatively receiving valve stem C therein. A bellows D is sealingly secured at one end to the valve stem and at its other end to a closing member E. A valve bonnet F extends outwardly from the valve body and is held thereon by a retaining member G. An actuator H is secured to an outer end of the valve stem and also connected to an outer portion of the valve bonnet.

More particularly, the valve body B has a first or inlet passage 10 and a second or outlet passage 12 in fluid communication with a valve chamber 14. The valve chamber includes a first or open end 16 defined in an outer portion of the valve body and a valve seat 18 generally disposed along an inner, generally radially extending surface 20 of the valve chamber. As is known in the art, the inlet and outlet passages 10, 12, are adapted to receive fluid couplings or the like for integrating the valve into a fluid system. The externally threaded regions 22 provided at outer ends of the valve body branches that include the inlet and outlet passages 10, 12 are merely illustrative of one type of fluid coupling arrangement. Other suitable arrangements can be used with equal success without departing from the scope and intent of the subject invention.

The valve stem C includes a first or inner end 30 and a second or outer end 32. The valve stem first end 30 is adapted for receipt in the valve chamber 14, specificaly through valve chamber open end 16. A stem tip sub-assembly 34 is threadedly received on the innermost portion of the valve stem first end. The stem tip sub-assembly includes a press-fit tip insert 36 constructed of KEL-F, a registered trademark of Minnesota Mining and Manufacturing Co. of St. Paul, Minn., adapted for sealing engagement with the valve seat 18. The KEL-F tip insert inhibits virtual leak from the thread area and drill point cavity of the stem tip sub-assembly and valve stem inner end. Of course, other materials having properties comparable to the KEL-F material may be used with equal success.

Figures 2, 4A, 4B:
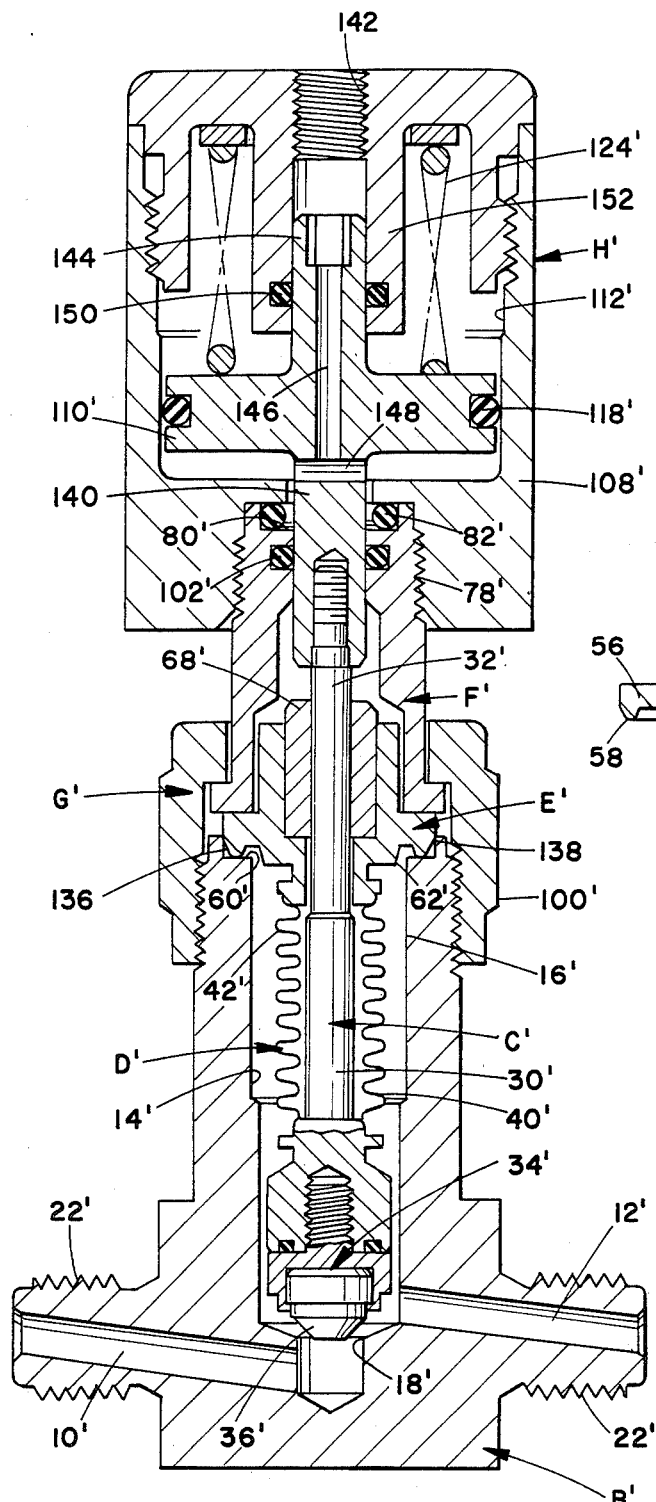
FIG. 2 is a vertical cross-sectional view of an alternate bellows valve embodiment according to the subject invention.
FIG. 4A is a slightly enlarged, detailed view of the closing member formed according to the subject invention; and, FIG. 4B is a further enlarged cross-sectional view of the encircled portion of FIG. 4A.

A radially outward extending flange portion 38 of the valve stem first end includes an axially extending surface 39 adapted to be sealingly mated to a first end of bellows D. The bellows is constructed of stainless steel in the preferred embodiment and is pleated or folded as generally shown in FIG. 1 for accommodating selective axial movement of the valve stem relative to the valve seat. The bellows first end 40 is welded or otherwise secured to the flange portion 38 while a bellows second end 42 is sealingly secured by similar means to closing member or weld ring E (FIG. 4A). The attachment of the bellows in this manner will cause it to be subjected to external compressive forces by fluid in the valve chamber. Such arrangement is commonly referred to as an inverted bellows and is desirable because it can withstand greater external forces than internal forces. Thus, use of an inverted bellows allows the valve to be used at more extreme system pressures. Additionally, this bellows arrangement promotes longer life of the seal structure. As is known, the bellows functions to isolate the valve stem from the system fluid in valve chamber 14.

Figure 3:
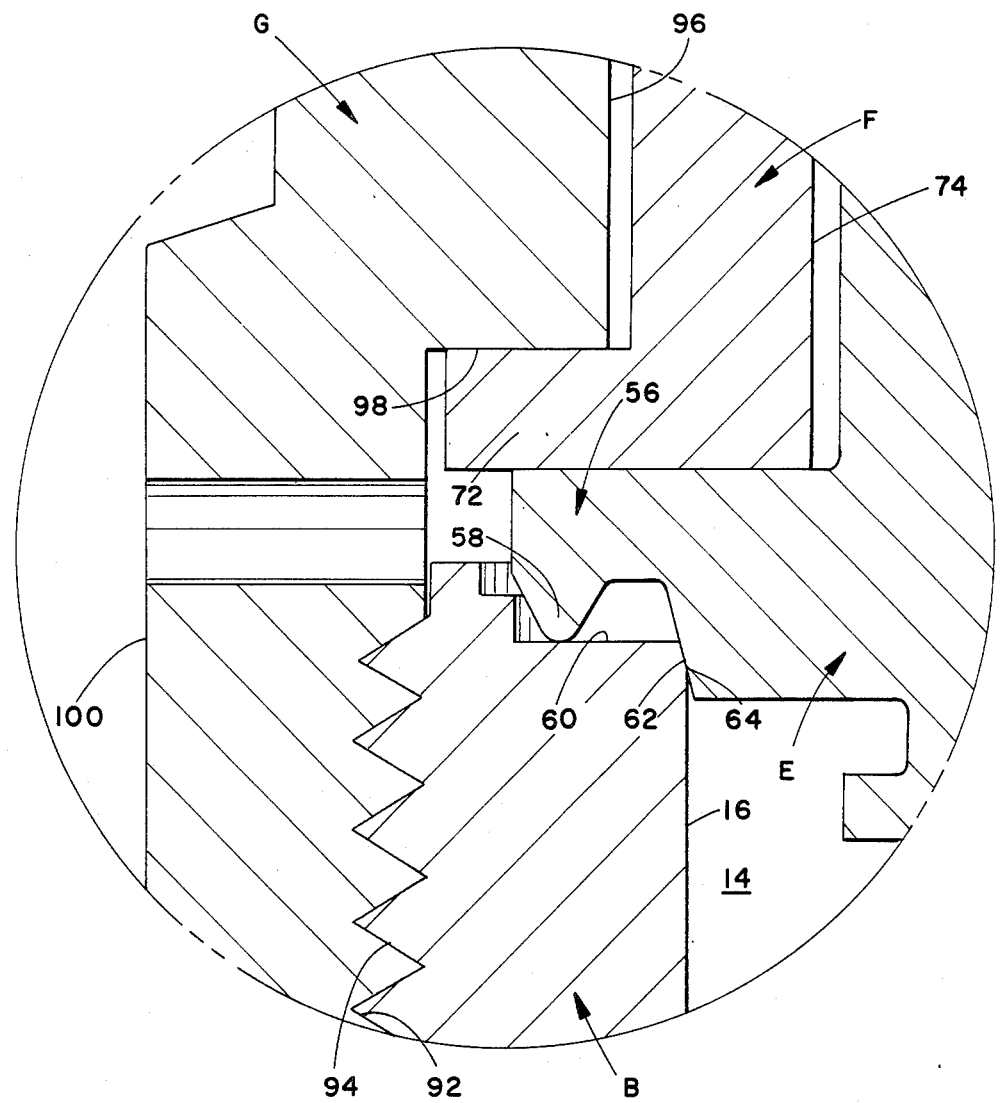
FIG. 3 is an enlarged, detailed view of the encircled portion of FIG. 1.

Turning now to FIGS. 3, 4A and 4B, and with continued reference to FIG. 1, it is apparent that the closing member E has an annular conformation to receive valve stem B therethrough. An axially extending exterior surface section 50 is designed to closely receive the bellows second end 42 thereon. A radially extending face 52 extends inwardly from the surface 50 and defines a stop or limit means to prevent overtravel of the valve stem during axial reciprocation. The limit surface 52 is adapted to abuttingly engage a valve stem shoulder 54 to limit the valve stem movement relative to the closing member. An enlarged diameter flange 56 is designed to overlay or close the valve chamber open end 16. More particularly, the enlarged diameter flange is adapted to sealingly engage the valve body adjacent the chamber open end 16.

The sealing engagement between flange 56 and the valve body at open end 16 is provided through use of a bead seal arrangement (FIG. 3). Preferably, a continuous rounded or arcuate annular bead 58 is provided on the lower surface of the enlarged diameter flange. This bead is designed for mating engagement with a generally planar shoulder 60 formed on the valve body in circumferential surrounding relation to the valve chamber open end 16. As will become more apparent, close engagement between the bead 58 and planar shoulder 60 advantageously provides a fluid tight seal around the open end of the valve chamber. Pressurized fluid is thereby confined in the valve chamber and leakage therefrom is prevented. As will be appreciated, the orientation of the bead seal can be reversed, i.e., by placing an arcuate bead on the valve body and having an associated planar surface on the closing member, and such reversal is deemed to fall within the spirit and intent of the subject invention.

Additionally, a closing member tapered surface 62 protrudes outwardly from the inner surface of the enlarged diameter flange at an area thereof spaced radially inward from bead 58. Surface 62, in turn, tapers radially inward over its axial extent from the flange inner surface. The tapered surface 62 is designed to facilitate alignment between the closing member and valve body. This relationship promotes alignment between the valve stem and the valve seat.

With particular reference to FIG. 3, it is apparent that the valve body includes a tapered surface 64 for cooperating relation with tapered surface 62 on the closing member. During valve assembly, these interfacing surfaces 62, 64 assure precise alignment between the closing member and valve body. Further, there is a predetermined space or gap between the valve body and the radially outer peripheries of the sealing bead 58 and enlarged diameter flange 56. This further assures that assembling alignment is achieved along tapered surfaces 62, 64.

With reference to FIG. 1, a bushing member 68 is received in an internal annular cavity 70 at the outer end of the closing member. In the preferred embodiment, this bushing member is constructed of bronze or like material and has an elongated axial dimension designed to support the valve stem along a predetermined length thereof. The bushing member provides accurate stem guiding at an area remote from the system fluid to further promote cleanliness of the valve assembly.

As shown in FIGS. 1 and 3, the valve bonnet F has a radially outward extending flange 72 at the inner end thereof which has a diameter closely approximating the peripheral dimension of the enlarged diameter flange 56. The radial flange 72 is adapted for mating engagement with an outwardly facing annular surface of the enlarged diameter flange 56 at an interface zone 73. In this manner, the closing member is axially interposed between the valve bonnet F and the valve body B. Further, the valve bonnet has axially extending inner wall surface 74 dimensioned to be radially spaced from the exterior surface of the closing member received therein. This radial clearance accommodates alignment between the various valve elements during assembly.

A bonnet sniffer tube (not shown) may be optionally employed to monitor the sealing integrity of the bellows and detent potential leakage of pressurized fluid into the valve bonnet cavity. A sniffer tube opening 76 (FIG. 1) extends radially through the sidewall of the valve bonnet F for receiving a sniffer tube in a conventional manner. The valve bonnet further includes a reduced diameter portion at the outer end thereof having an externally threaded region 78. This reduced diameter section defines an external shoulder 80 adapted to receive a first seal member 82, such as an O-ring or the like, between the valve bonnet F and the associated actuator housing.

Continuing with reference to FIGS. 1 and 3, a bonnet nut or retaining member G is disposed in surrounding relationship with the valve bonnet F, closing member E, and valve body B. The bonnet nut includes an interior threaded portion 92 to matingly engage exterior threaded region 94 on the valve body. An opening 96 receives the valve bonnet exterior surface therethrough but has a dimension less than the diameter of the radial flange 72. Further, a radial shoulder 98 is defined in the interior of the bonnet nut and is adapted to matingly engage the radial flange 72 of the valve bonnet. Advancing the bonnet nut relative to the valve body at the area of conventional wrench flats 100 tightens the shoulder 98 into retaining engagement with the radial flange 72. The flange 72, in turn, exerts an axial compressive force on the enlarged diameter flange 56 of the closing member E at interface 73. This, in turn, causes rounded bead 58 to be urged into an effective sealing relationship against the generally planar shoulder 60 of the valve body (FIG. 3).

According to this arrangement, the axial compressive force of the bonnet nut is transferred from shoulder 98, through flange 72, through enlarged diameter flange 56, and to the continuous sealing bead 58. Thus, even with incorporation of the radial spacing between the bonnet nut, valve bonnet, and closing member, shoulder 98 is still axially aligned over the seal bead 58. The force transfer through the noted valve components provides a reliable sealing relationship between the sealing bead 58 and planar shoulder 60 on the valve body.

Incorporation of the rounded bead as the seal means between the closing member and valve body permits the elimination of a gasket which has conventionally been disposed between these or similar abutting surfaces. The bead arrangement provides a more reliable seal and, additionally, requires less torque to tighten the bonnet nut G on the valve body. Lower torque is an important feature since it permits the reduction or elimination of the need for lubrication on the bonnet nut threads. In high purity systems where cleanliness is of utmost importance, elimination or reduction of the lubricant is of vital importance.

A second seal member 102 is disposed between the valve stem and an opening 104 in the upper portion of the valve bonnet. The second seal member 102 is preferably an O-ring construction and designed to provide a dynamic seal around the valve stem. In the FIG. 1 embodiment, the seal member 102 is received in a valve stem groove, although it is understood that a seal member receiving groove could alternatively be formed in the valve bonnet.

An actuator H is operatively disposed with the valve stem for selectively imparting reciprocal movement thereto to open and close the valve. Specifically, the actuator housing 108 is designed for engagement with the external threads 78 on the reduced diameter portion of the valve bonnet. The actuator is illustrated as a normally-closed operator in which a piston 110 defined in an actuator chamber 112 is spring biased to an inner or valve closed position. As shown, the outer end 32 of the valve stem retainingly engages the piston 110 thereon by means of a nut 114 and washer 116. Other retaining arrangements may be utilized with equal success without departing from the scope and intent of the subject invention. A piston outer seal member 118 is sealingly interposed between the outer periphery of the piston and the actuator chamber 112, and a piston inner seal member 120 is interposed between the valve stem outer end and the piston.

In the arrangement shown in FIG. 1, a pair of concentric springs 124 extend between the outer area of the housing and the piston so that the valve stem is normally biased toward its seated or valve closed position. A threaded vent port 126 in the outer area of the actuator allows exhaust air to be piped away from the actuator chamber to some remote location, and this, too, promotes cleanliness of the valve.

The vent port 126 provides an auxiliary function to the apparent use as an air vent. The port is of sufficient diameter to permit introduction of a tool, such as a screwdriver, into operative engagement with a slot or groove 128 formed inthe outermost end portion of the valve stem. Receipt of an associated tool (not shown) into slot 128 prevents the valve stem from rotating while the stem tip sub-assembly is replaced. Thus, maintenance and/or replacement is facilitated.

Actuator fluid pressure is supplied to the inner side of the piston through a rotatable turret 132. A radially extending opening 134 communicates between the rotatable turret and the actuator chamber 112 so that fluid pressure may be selectively supplied to the inner side of the piston. Sufficient pressure acts on the inner surface area of the piston to provide an opening force greater than the closing force of spring pair 124. Seal means 136, 138 may be provided between the actuator housing 108 and the rotatable turret 132. Selective control of fluid pressure to the inner side of the piston permits alternate opening and closing of the stem tip relative to the valve seat 18 in a manner known in the art.

The addition of the seal bead reduces or eliminates the need for lubrication between selected valve components. The seal bead, coupled with the vent port and elongated bushing at an area remote from the system fluid, promotes clean valve operation. Use of strategically located tapered surfaces and spaced clearances between the closing member, valve bonnet, and bonnet nut enhance alignment between the valve components.

With reference to FIG. 2, a detailed description of an alternate inverted bellows embodiment designed for lower pressure ranges will be described. For ease of illustration, like elements are identified by like numerals with a primed (') suffix and new elements are identified by new numerals. Since a majority of the structural elements and functional characteristics of the alternate embodiment are similar to the preferred embodiment of FIG. 1, the following detailed description will focus on those areas of significant structural and functional departure therefrom. Unless specifically notes otherwise, all like numbered elements having a primed suffix opate substantially as described above.

In the arrangement of FIG. 2, a noticeable distinction resides in the alignment process between the valve body B' and the closing member E'. The outer radial periphery of the seal bead 58', generally designated 136, is designed for mating contact with the valve body along a generally axial surface 138 thereof. Contrary to the FIG. 1 embodiment where the outer periphery of the seal bead defned a gap with the valve body, the alignment between the closing member and valve body in this alternate embodiment occurs along the seal bead/valve body interface without any deleterious effect on the sealing function between the bead and planar surface 60'.

Further, the tapered surface 62' is spaced radially inward from the valve body. Thus, the alignment process occurs solely between the outer periphery 136 of the seal bead and valve body 138. This defines a radially outer alignment process relative to the seal bead while the above-described FIG. 1 embodiment defines a radially inner alignment process relative to the seal bead. Since no alignment occurs along tapered surface 62', it is readily apparent that tapered surface 64 at the open end 16 of the valve chamber in FIG. 1 need not be formed in the alternate embodiment. The actuator housing 108' is threadedly secured to valve bonnet F' as at threaded area 78'. A first seal member 82' is received on an interior shoulder 80' of the valve bonnet. The first seal member compressingly engages the actuator housing 108' for sealing between the actuator H' and the valve bonnet F'.

The outer end 32' of the valve stem is retainingly connected to a stem extension portion 140 of the piston 110'. As shown, this interconnection comprises a threaded engagement between these members, although equivalent structure for achieving this connection may be used without departing from the scope and intent of the subject invention. A second seal member 102' is compressingly held between the stem extension 140 and the valve bonnet. This dynamic seal assists in aligning the stem relative to the valve bonnet in addition to sealing the actuator chamber 112' in the housing. The piston 110' is sealingly received in the actuator chamber bymeans of a piston outer seal member 118'. Since the FIG. 2 embodiment is utilized in lower pressure situations, only a single spring 124' is necessary to exert a biasing force and normally close the valve.

A fluid inlet port 142 is designed in permit fluid, such as air, to exert a pressure on the inner side of the piston. In order to achieve this, a second stem extension 144 extends outwardly from the piston outer side, that is, in a direction generally opposite to that of the first stem extension 140. A passage 146 extends axially through the second stem extension and piston into communication with a radial cross flow passage 148 disposed adjacent the inner side of the piston. In this manner, fluid pressure may be selectively introduced to the inner side of the piston. Fluid pressure may be provided to the actuator chamber for exerting an outwardly directed force against piston 110' to overcome the opposite biasing force of spring 124'. A dynamic seal member 150 is disposed between stem extension 144 and an axially extending cylindrical flange 152 of housing. Of course, the normally closed valve arrangement illustrated in FIG. 2 may optionally be replaced with a normally open or double acting arrangement as is known in the art.

The invention has been described with reference to the preferred and alternate embodiments. Obviously modifications and alterations will occur to others upon a reading and understanding of this specification. It is intended to include all such modifications and alterations in so far as they come within the scope of the appended claims or the equivalents thereof.

Having thus described the invention, it is now claimed:

1. An inverted bellows valve comprising:
    a valve body having a fluid chamber defined therein with inlet and outlet passages being in fluid communication with said chamber on opposite sides of a valve seat;
    an elongated valve stem having a valve member at a first end operatively received in said chamber for cooperation with said seat to selectively control fluid flow between said inlet and outlet passages, a second end of said stem extending outwardly from said chamber;
    a bellows disposed in said chamber in surrounding relation to an axial portion of said valve stem for isolating said stem from a system fluid in said chamber acting externally against said bellows;
    a closing member sealingly engaging said valve body at an open end of said chamber and receiving said valve stem therethrough, said closing member being sealingly connected to one end of said bellows and having a shoulder thereon defining a limit stop for valve stem movement to a valve open position;
    a circumferentially continuous bead having an arcuate cross-section and extending axially outward from one of said valve body and closing member for sealing engagement with a generally planar surface extending generally transversely of the axis of said stem and located on the other of said valve body and closing member;
    an actuator operatively associated with said valve stem second end to effect reciprocating type movement of said stem between valve open and closed positions; a bonnet member connected directly between said closing member and said actuator; and,
    a retaining means at least partially surrounding said bonnet member and said closing member for applying an axially directed clamping force to said closing member and said bonnet member to produce sealing engagement between said bead and said generally planar surface.

2. The bellows valve as defined in claim 1 further comprising spaced, axially extending surfaces on said closing member and valve bonnet providing lateral clearance between said closing member and said valve bonnet for permitting relative movement between said bonnet and said closing member in directions transverse to the axis of said stem for facilitating alignment between said actuator and said valve stem.

3. The bellows valve as defined in claim 1 wherein said valve member includes a stem tip threadedly secured to said valve stem first end whereby said stem tip defines a replaceable sub-assembly.

4. The bellows valve as defined in claim 1 wherein one of said valve body and closing member is provided with a tapering surface cooperating with a surface on the other of said valve body and closing member to facilitate substantially coaxial alignment therebetween.

5. The bellows valve as defined in claim 4 wherein said surface on the other of said valve body and closing member is tapered.

6. The bellows valve as defined in claim 4 wherein said tapering surface is disposed radially inward from said arcuate bead.

7. The bellows valve as defined in claim 4 wherein said tapering surface is provided on said closing member and is disposed radially inward from said arcuate bead.

8. The bellows valve as defined in claim 4 wherein said tapering surface is disposed radially outward from said arcuate bead.

9. The bellows valve as defined in claim 4 wherein said tapering surface is provided on said closing member and is defined on an outer periphery of said seal bead.

10. The bellows valve as defined in claim 1 wherein said actuator includes a housing having an actuator chamber defined therein and a piston received in said actuator chamber, said piston operatively connected to said valve stem second end.

11. The bellows valve as defined in claim 10 wherein said piston is spring-biased to one of a valve open and closed position, said actuator having means for supplying pressurized fluid to act against said spring biasing force and shift said piston to the other of said valve open and valve closed positions.

12. The bellows valve as defined in claim 10 wherein said housing includes an opening extending therethrough, said opening adapted to receive an associated tool therethrough for holding said valve stem second end during replacement of said stem tip.

13. The bellows valve as defined in claim 10 further including a first seal member disposed between said valve bonnet and said actuator housing, said seal member adapted to seal said actuator with said valve bonnet as it is compressed.

14. The bellows valve as defined in claim 10 further including a second seal member disposed between said valve bonnet and valve stem adjacent said second end thereof, said second seal member adapted to align said actuator with said valve bonnet as it undergoes compression.

15. A bellows valve comprising:
a valve body having inlet and outlet passages in fluid communication with a valve chamber and a valve seat disposed between said inlet and outlet passages;
a valve stem having a replaceable stem tip insert at one end adapted for selective sealing engagement with said valve seat, a valve stem second end extending outwardly from said valve chamber;
a bellows sealingly surrounding said valve stem adjacent said one end, said bellows having a pair of opposed ends, one end secured to said stem;
a closing member operatively associated with said valve chamber and having stem guide surfaces through which said stem extends for permitting stem movement relative to said valve seat, said closing member preventing fluid flow from said valve chamber around said valve stem;
said bellows other end sealingly engaging said closing member whereby system fluid imposes an external compressive force on said bellows;
a valve bonnet disposed over said closing member adjacent an outer end of said valve body, said valve bonnet further having a stem guide opening through which said stem extends;
mating tapered surfaces on said closing member and valve body for alignment therebetween during assembly;
means for releasably clamping said closing member and said bonnet to said valve body;
said closing member and said bonnet having abutting planar surfaces for permitting relative movement between said bonnet and said closing member in directions transverse to said stem for permitting alignment to be achieved between said stem guide surface and said stem guide opening while said closing member is in releasable engagement with said bonnet; and,
actuating being directly connected to said bonnet and means operatively secured to said valve stem second end for selectively advancing and retracting said valve stem one end relative to said valve seat.

16. A bellows valve comprising:
a valve body having a fluid chamber defined therein with inlet and outlet passages being in fluid communication with said chamber on opposite sides of a valve seat;
an elongated valve stem having an axis with a valve member at a first end operatively received in said chamber for operation with said seat to selectively control fluid flow between said inlet and outlet passages, a second end of said stem extending outwardly from said chamber;
a bellows disposed in said chamber in surrounding relation to an axial portion of said valve stem for isolating said stem from a system fluid in said chamber acting externally against said bellows;
a closing member sealingly engaging said valve body at an open end of said chamber and having a stem guide surface slidably receiving said valve stem therethrough, said closing member being sealingly connected to one end of said bellows;
an actuator operatively associated with said valve stem second end to effect reciprocating type movement of said stem between valve open and closed positions;
a valve bonnet positioned between said valve body and said actuator and extending over said closing member, said valve bonnet including a stem guide opening through which said stem extends; said actuator means being directly connected to said bonnet;
means for permitting relative movement between said bonnet and said closing member in directions transverse to the axis of said stem to allow alignment of said stem guide surface in said closing member with said stem guide opening in said bonnet member while said closing member is in an assembled engagement with said bonnet; and,
means for releasably clamping said bonnet and said closing member to said valve body.

17. The bellows valve as defined in claim 16 wherein said closing member and said valve body have cooperating seal surfaces for sealing between said valve body and said closing member, at least one of said cooperating sealing surfaces including a continuous arcuate bead for sealing between said valve body and said closing member when said closing member is clamped to said body.

18. The bellows valve as defined in claim 16 wherein said closing member extends into said bonnet and wherein said guide surface is defined by a bushing member carried in said closing member.

19. The bellows valve as defined in claim 16 wherein said means for permitting relative movement between said bonnet and said closing movement in directions transverse to the axis of said stem includes cooperating planar surfaces on said closing member and said bonnet, each said planar surface lying in a plane perpendicular to the axis of said stem.

* * * * *

UNITED STATES PATENT AND TRADEMARK OFFICE
CERTIFICATE OF CORRECTION

PATENT NO. : 4,687,017
DATED : August 18, 1987
INVENTOR(S) : Danko, et al.

It is certified that error appears in the above—identified patent and that said Letters Patent is hereby corrected as shown below:

Column 9, lines 60-61 reading:

actuating being directly connected to said bonnet and means operatively secured to said valve stem secshould read:

actuating means being directly connected to said bonnet and operatively secured to said stem sec- Signed and Sealed this Fifteenth Day of March, 1988

Attest:

DONALD J. QUIGG

Attesting Officer

Commissioner of Patents and Trademarks